US008391479B2

(12) United States Patent  
Ebeid (10) Patent No.: US 8,391,479 B2
(45) Date of Patent: Mar. 5, 2013

(54) COMBINING INTERLEAVING WITH FIXED-SEQUENCE WINDOWING IN AN ELLIPTIC CURVE SCALAR MULTIPLICATION

(75) Inventor: Nevine Maurice Nassif Ebeid, Kitchener (CA)

(73) Assignee: Research In Motion Limited, Waterloo (CA)

( * ) Notice: Subject to any disclaimer, the term of this patent is extended or adjusted under 35 U.S.C. 154(b) by 1200 days.

(21) Appl. No.: 12/040,177

(22) Filed: Feb. 29, 2008

(65) Prior Publication Data

US 2008/0273694 A1 Nov. 6, 2008

Related U.S. Application Data

(60) Provisional application No. 60/893,510, filed on Mar. 7, 2007.

(51) Int. Cl.
*H04L 9/38* (2006.01)
(52) U.S. Cl. ............... 380/44; 380/28; 380/30
(58) Field of Classification Search .......... 380/44, 380/28, 30
See application file for complete search history.

(56) References Cited

U.S. PATENT DOCUMENTS

| | | | |
|---|---|---|---|
| 6,304,658 B1 * | 10/2001 | Kocher et al. | 380/30 |
| 7,272,226 B2 * | 9/2007 | Vanstone | 380/44 |
| 7,715,565 B2 * | 5/2010 | Kimmel et al. | 380/281 |
| 7,734,045 B2 * | 6/2010 | Sandhu et al. | 380/44 |
| 2003/0061498 A1 | 3/2003 | Drexler et al. | |
| 2005/0078821 A1 | 4/2005 | Jin et al. | |

FOREIGN PATENT DOCUMENTS

| | | |
|---|---|---|
| EP | 1548687 A1 | 6/2005 |
| EP | 1729442 A1 | 12/2006 |
| EP | 1816624 A1 | 8/2007 |
| WO | 0135573 A1 | 5/2001 |
| WO | 01/48974 | 7/2001 |

OTHER PUBLICATIONS

Benoit Chevallier-Mames et al. "Low-Cost Solutions for Preventing Simple Side-Channel Analysis: Side-Channel Atomicity" IEEE Transactions on Computers, vol. 53, No. 6, Jun. 2004. (pp. 760-768).*
Daniel J Bernstein, Pippenger's Exponentiation Algorithm, Mathematics Subject Classification Primary 11Y16, Jan. 18, 2002, Department of Mathematics, Statistics, and Computer Science (M/C 249), The University of Illinois at Chicago, Chicago, IL.
Ciet M et al.: "(Virtually) Free randomization techniques elliptic curve cryptography" Lecture notes in Computer Science, Springer, DE, vol. 2836, Oct. 10, 2003.
Bodo Moller: "Algorithms for Multi-exponentiation" Lecture notes in Computer Science, Springer, DE, vol. 2259, Jan. 1, 2001.

(Continued)

*Primary Examiner* — Edward Zee
*Assistant Examiner* — Thomas Gyorfi
(74) *Attorney, Agent, or Firm* — Ridout & Maybee LLP (57) ABSTRACT

An Elliptic Curve scalar multiplication product involving a scalar and a base point is determined in a manner that acts as a countermeasure to side channel attacks. A key splitting strategy called Additive Splitting Using Division involves selecting a random integer and determining an integer quotient and a remainder by dividing the scalar by the random integer. The product may then be expressed as a sum of scalar multiplications, which may be evaluated using a combination of a fixed-sequence window method with the known Interleaving method. When the integer quotient and remainder are odd, major collisions may be avoided when determining the product. Accordingly, the random integer that determines whether the integer quotient and remainder are odd may be subject to some control.

15 Claims, 8 Drawing Sheets

OTHER PUBLICATIONS

Okeya K et al.: "Use of montgomery trick in precomputation of multi-scalar multiplication in elliptic curve cryptosystems". IEICE Transactions on Fundamentals of Electronics, Communications and Computer Sciences, Engineering Sciences Society, Tokyo, JP, vol. E86-A, No. 1, Jan. 1, 2003.

Gallant R P et al.: "Faster point multiplication on elliptic curves with efficient endomorphisms" advances in cryptology, crypto 2001. 21st Annual International Cryptology Conference, Santa Barbara, CA, Aug. 19-23, 2001.

Ciet M et al.: "Preventing differential analysis in GLV elliptic curve scalar multiplication" Cryptographic Hardware and Embedded Systems, Internationalworkshop, XX, XX, Aug. 13, 2002.

Izu T et al.: "Improved elliptic curve multiplcation methods resistant against side channel attacks" Progress in cryptology-indocrypt. International Conference Incryptology in India. Proceedings, XX, XX, Dec. 16, 2002.

Nicholas Theriault: "SPA resistant left-to-right integer recodings" Jan. 1, 2006.

Okeya K et al.: "Fast multi-scalar multiplication methods on elliptic curves with precomputation strategy using mongomery trick" Cryptographic hardware and embedded systems, International Workshop, XX , XX Aug. 13, 2002.

European Search Report dated Nov. 30, 2010 for corresponding European Patent Application No. 08733547.7.

* cited by examiner

COMBINING INTERLEAVING WITH FIXED-SEQUENCE WINDOWING IN AN ELLIPTIC CURVE SCALAR MULTIPLICATION

CROSS REFERENCE TO RELATED APPLICATIONS

The present application claims priority to U.S. Provisional Patent Application Ser. No. 60/893,510, filed Mar. 7, 2007, the contents of which are hereby incorporated herein by reference.

The present application is related to US Patent Application Publication No. 2008/0219438, which is being filed on even date herewith under, entitled "Method And Apparatus For Generating A Public Key In A Manner That Counters Power Analysis Attacks," the contents of which are hereby incorporated herein by reference.

The present application is related to US Patent Application Publication No. 2008/0219437, which is being filed on even date herewith under, entitled "Method and Apparatus for Performing Elliptic Curve Scalar Multiplication in a Manner that Counters Power Analysis Attacks," the contents of which are hereby incorporated herein by reference.

The present application is related to US Patent Application Publication No. 2008/0219450, which is being filed on even date herewith under, entitled "Methods And Apparatus For Performing An Elliptic Curve Scalar Multiplication Operation Using Splitting," the contents of which are hereby incorporated herein by reference.

The present application is related to US Patent Application Publication No. 2008/0275932, which is being filed on even date herewith under, entitled "Integer Division In A Manner That Counters A Power Analysis Attack," the contents of which are hereby incorporated herein by reference.

The present application is related to US Patent Application Publication No. 2008/0301458, which is being filed on even date herewith under, entitled "DPA Countermeasure for the ECDSA," the contents of which are hereby incorporated herein by reference.

The present application is related to US Patent Application Publication No. 2008/0301459, which is being filed on even date herewith under, entitled "Power Analysis Countermeasure for the ECMQV Key Agreement Algorithm," the contents of which are hereby incorporated herein by reference.

FIELD OF THE INVENTION

The present application relates generally to cryptography and, more specifically, to combining interleaving with fixed-sequence windowing in an elliptic curve scalar multiplication.

BACKGROUND OF THE INVENTION

Cryptography is the study of mathematical techniques that provide the base of secure communication in the presence of malicious adversaries. The main goals of secure communication include confidentiality of data, integrity of data and authentication of entities involved in a transaction. Historically, "symmetric key" cryptography was used to attempt to meet the goals of secure communication. However, symmetric key cryptography requires entities to exchange secret keys through a secret channel prior to communication. One weakness of symmetric key cryptography is the security of the secret channel. Public key cryptography provides a means of securing a communication between two entities without requiring the two entities to exchange secret keys through a secret channel prior to the communication. An example entity "A" selects a pair of keys: a private key that is only known to entity A and is kept secret; and a public key that is known to the public. If an example entity "B" would like to send a secure message to entity A, then entity B needs to obtain an authentic copy of entity A's public key. Entity B encrypts a message intended for entity A by using entity A's public key. Accordingly, only entity A can decrypt the message from entity B.

For secure communication, it is essential that entity A select the pair of keys such that it is computationally infeasible to compute the private key given knowledge of the public key. This condition is achieved by the difficulty (technically known as "hardness") of known mathematical problems such as the known integer factorization mathematical problem, on which is based the known RSA algorithm, which was publicly described in 1977 by Ron Rivest, Adi Shamir and Leonard Adleman.

Elliptic curve cryptography is an approach to public key cryptography based on the algebraic structure of elliptic curves over finite mathematical fields. An elliptic curve over a finite field, K, may be defined by a Weierstrass equation of the form $$y^2 + a_1 xy + a_3 y = x^3 + a_2 x^2 + a_4 x + a_6 \qquad (0.1)$$

If $K = F_p$, where p is greater than three and is a prime, equation (0.1) can be simplified to $$y^2 = x^3 + ax + b. \qquad (0.2)$$

If $K = F_{2^m}$, i.e., the elliptic curve is defined over a binary field, equation (0.1) can be simplified to $$y^2 + xy = x^3 + ax^2 + b. \qquad (0.3)$$

The set of points on such a curve (i.e., all solutions of the equation together with a point at infinity) can be shown to form an abelian group (with the point at infinity as the identity element). If the coordinates x and y are chosen from a large finite field, the solutions form a finite abelian group.

Elliptic curves cryptosystems rely on the hardness of a problem called the elliptic curve discrete logarithm problem (ECDLP). Where P is a point on an elliptic curve E and where the coordinates of P belong to a finite field, the scalar multiplication kP, where k is a secret integer, gives a point Q equivalent to adding the point P to itself k times. It is computationally infeasible, for large finite fields, to compute k knowing P and Q. The ECDLP is: find k given P and Q (=kP).

BRIEF DESCRIPTION OF THE DRAWINGS

Reference will now be made to the drawings, which show, by way of example, embodiments of the invention and in which.

DETAILED DESCRIPTION OF THE EMBODIMENTS

In operation, a device implementing an Elliptic Curve Cryptosystem selects a value for a secret, or private, key, k, which may be a long term secret key or a short term secret key. Additionally, the device has access to a "base point", P. The device then generates Q=kP and publishes Q as a public key. Q may then be used for encryption or may then be used in a key agreement protocol such as the known Elliptic Curve Diffie-Hellman (ECDH) key agreement protocol. In the known Elliptic Curve Menezes-Qu-Vanstone (ECMQV) key agreement protocol, Q=kP is not known as public key as in the ECDH key agreement protocol. In the ECMQV key agreement protocol and the known Elliptic Curve Digital Signature Algorithm (ECDSA), each entity has a (public key, private key) pair, say for entity A, this pair is ($d_A$, $Q_A$). This is long term pair, hence $Q_A$=$d_A$P is computed once per key life. Notably, in another step of the ECMQV key agreement protocol and the ECDSA, there is a random integer k, selected by the signing entity in the ECDSA or both entities separately in the ECMQV, that is multiplied by the point P, i.e., kP is computed.

The general point of an attack on a cryptosystem is to determine the value of the private key, k. Recently, especially given the mathematical difficulty of solving the ECDLP, cryptosystem attacks have been developed that are based on careful measurements of the physical implementation of a cryptosystem, rather than theoretical weaknesses in the algorithms. This type of attack is called a "side channel attack". In one known example side channel attack, a measurement of the exact amount of time taken by known hardware to encrypt plain text has been used to simplify the search for a likely private key. Other examples of side channel attacks involve measuring such physical quantities as power consumption, electromagnetic leaks and sound. Many side channel attacks require considerable technical knowledge of the internal operation of the system on which the cryptography is implemented. In particular, a power analysis attack involves obtaining information useful to the determination of a private key by observing properties of electricity in the power lines supplying hardware implementing the cryptosystem or by detecting electromagnetic emanations from the power lines or said hardware.

In a Simple Power Analysis (SPA) attack, an attacker monitors the power consumption of a device to visually identify large features of the generation of the public key Q through the scalar multiplication operation, kP. Indeed, monitoring of the power consumption during a scalar multiplication operation may enable an attacker to recognize exact instructions as the instructions are executed. For example, consider that the difference between the power consumption for the execution of a point doubling (D) operation and power consumption for the execution of a point addition (A) operation is obvious. Then, by investigating one power trace of a complete execution of a double-and-add algorithm employed to perform a scalar multiplication, the bits of the scalar private key k may be revealed. In particular, whenever a D operation is followed by an A operation, the corresponding bit $k_i$=1, otherwise if a D operation is followed by another D operation, then $k_i$=0. A sequence of doubling and adding point operations is referred to as a DA sequence.

In a Differential Power Analysis (DPA) side-channel attack, an attacker exploits the varying power consumed by a microprocessor while the microprocessor executes cryptographic program code. Using statistical analysis of the power consumption measurements of many runs of a given cryptographic algorithm, the attacker may infer information about a secret key used in the given cryptographic algorithm. A DPA attack on a scalar multiplication algorithm may be based on collecting hundreds of power consumption measurements obtained during the execution of the scalar multiplication with the same private key. Even if the execution is SPA-resistant, a statistical analysis on the measurements collected can still reveal the private key.

It would be desirable to obtain the result of an Elliptic Curve Scalar Multiplication operation using a split private key in a manner that counters side-channel attacks.

It can be shown that an "Additive Splitting Using Division" approach to key-splitting using a random integer provides a suitable countermeasure to DPA attacks while obtaining a result of an Elliptic Curve Scalar Multiplication operation. Since the Additive Splitting Using Division involves expressing the primary ECSM product as a sum of secondary ECSM products, an Interleaving method may be used to evaluate the sum. Furthermore, strategies borrowed from the known fixed-sequence window method of determining an ECSM product may be imported into the Interleaving method, thereby creating a hybrid approach. Unfortunately, conditions for collisions exist in the hybrid approach in a manner similar to the manner in which conditions for collisions exist in the Interleaving method, though with reduced likelihood. However, by selecting the random number carefully and managing key-splitting parameters, most collisions may be avoided.

In accordance with an aspect of the present application there is provided a method of publishing an Elliptic Curve scalar multiplication product of a scalar and a base point in a manner that counters side-channel attacks. The method includes selecting a random integer, determining a quotient key-splitting parameter and a remainder key-splitting parameter by performing an integer division operation with the scalar as dividend and the random integer as divisor and determining an interim point as a product of the random integer and the base point, wherein determining the interim point includes performing a fixed-sequence windowing method that includes defining a first table, the first table including odd multiples of the base point. The method also includes determining a sum of a first product and a second product, wherein factors of the first product include the quotient key-splitting parameter and the interim point and factors of the second product include the remainder key-splitting parameter and the base point, wherein the determining the sum includes performing an interleaving method combined with the fixed-sequence windowing method including defining a second table, the second table including odd multiples of the interim point and publishing the sum as the product of the scalar and the base point. In other aspects of the present application, a mobile communication device is provided for carrying out this method a computer readable medium is provided for adapting a processor to carry out this method.

In accordance with another aspect of the present application there is provided a method for countering side-channel attacks on an operation to determine an elliptic curve scalar multiplication product of a scalar and a base point on an elliptic curve, the base point having a prime order. The method includes selecting a random integer, determining a quotient key-splitting parameter and a remainder key-splitting parameter by performing an integer division operation with the scalar as dividend and the random integer as divisor and determining an interim point as a product of the random integer and the base point, wherein the determining the interim point includes performing a fixed-sequence windowing method that includes defining a first table, the first table including odd multiples of the base point. The method further includes determining a sum of a first product and a second product, wherein factors of the first product include the quotient key-splitting parameter and the interim point and factors of the second product include the remainder key-splitting parameter and the base point, wherein the determining the sum includes performing an interleaving method combined with the fixed-sequence windowing method including defining a second table, the second table including odd multiples of the interim point.

Other aspects and features will become apparent to those of ordinary skill in the art upon review of the following description of example embodiments in conjunction with the accompanying figures.

It has previously been suggested that, to avoid revealing the scalar to a DPA attack on an ECSM operation, i.e., Q=kP, the scalar, k, may be split into two or more parts. Example steps in an expanded ECSM operation are presented in FIG. 1, as part of a larger Elliptic Curve cryptosystem application. The ECSM is called "expanded" due to the extra steps involved in splitting the scalar. A processor executing instructions describing the expanded ECSM operation receives (step 102) a request for an ECSM product, e.g., a request for Q=kP. Responsive to receiving the request, and for reasons that will become clear hereinafter, the processor proceeds to determine Q=gS+hP. Initially, the processor determines (step 104) key-splitting parameters g and h, where, as part of determining the key-splitting parameters, the processor also selects a random integer, r. Subsequently, the processor determines (step 106) an interim point S. The processor then uses the key-splitting parameters, in conjunction with the base point, P, to perform (step 108) an ECSM operation to determine Q=gS+hP. Upon completion of the ECSM operation, the processor publishes (step 110) the product, Q, of the ECSM operation to the requesting application. In one instance, the product of the ECSM operation may be published as a public key in an Elliptic Curve cryptosystem.

Figure 1:
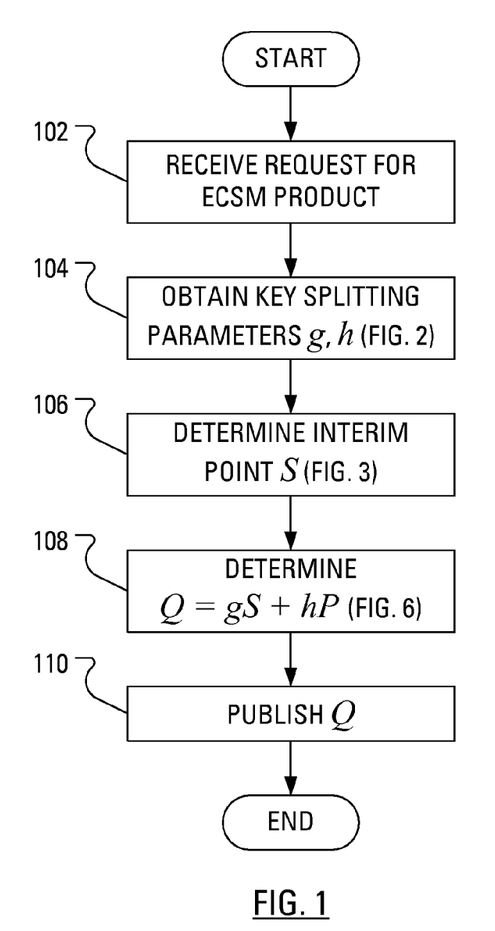
FIG. 1 illustrates steps of an example method of determining a product of a scalar and a point on an elliptic curve.

One example of the key splitting that may be performed in step 104 is based on a random integer and is called "Additive Splitting Using Division". In this key-splitting scheme, a random integer is selected. Once the random integer has been selected, the scalar is split by dividing the scalar by the random integer to obtain an integer quotient, multiplying the base point by the random integer to obtain an interim point, multiplying the interim point by the integer quotient and adding a product of the remainder of the integer division and the base point. That is, $$kP = \left\lfloor \frac{k}{r} \right\rfloor rP + (k \bmod r)P. \quad (0.4)$$

Equation (0.4) can be rewritten as $$kP = gS + hP, \quad (0.5)$$

where g is the integer quotient, h is the remainder and S=rP is the interim point. Put another way, $$k = g*r + h. \quad (0.6)$$

Where n is the bit length of k, the bit length, l, of the random integer r may be chosen to be $$l = \lceil \frac{n}{2} \rceil.$$

That is, r is chosen uniformly at random from the range $[2^{l-1}, 2^l-1]$. Hence, the bit length of g is at most $$\lfloor \frac{n}{2} \rfloor + 1 \le l + 1$$

and the bit length of g is at least l and the bit length of h is at most l.

Figure 2:
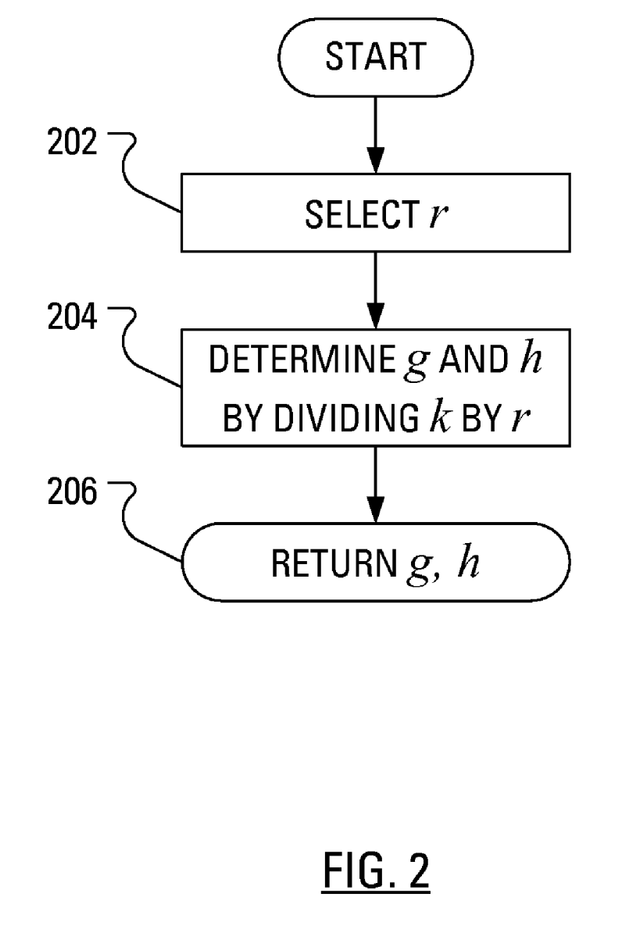
FIG. 2 illustrates steps of an example method of obtaining key splitting parameters as required by the example method of FIG. 1.

An example method of obtaining the key splitting parameters g and h (step 104, FIG. 1) is presented in FIG. 2. The method begins with a selection (step 202), by a processor carrying out the method, of a random integer, r. The processor then determines (step 204) an integer quotient, g, and remainder, h, by dividing the scalar private key k by the random number, r. The processor then returns (step 206) the key-splitting parameters to the example method of FIG. 1.

Once the key-splitting parameters have been obtained (step 104), the determination of kP begins with performance of an ECSM to determine (step 106) the interim point S=rP, where the scalar, r, is of a size half the size of k.

As a manner in which to perform the ECSM to determine the interim point S, it is proposed herein to use an adapted version of a fixed-sequence window method as suggested in N. Thériault, "SPA resistant left-to-right integer recodings", *Selected Areas in Cryptography*—SAC '05, LNCS, vol. 3897, pp. 345-358, Springer-Verlag, 2006 (hereinafter, "Thériault"), and in C. H. Lim, "A new method for securing elliptic scalar multiplication against side-channel attacks", *Australian Conference on Information Security and Privacy*—ACISP'04, LNCS, vol. 3108, pp. 289-300, Springer-Verlag, 2004 (hereinafter, "Lim").

Figure 3:
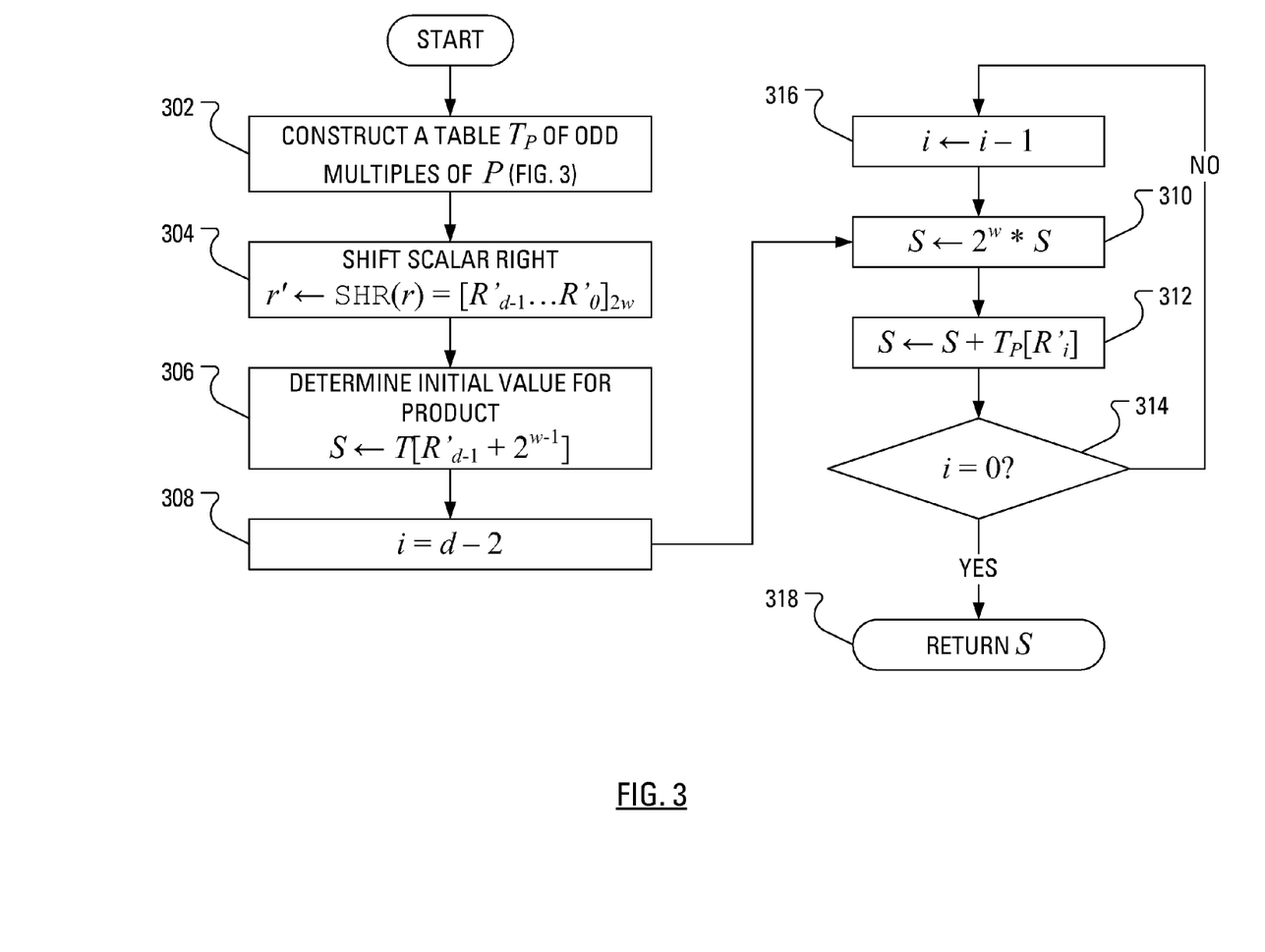
FIG. 3 illustrates steps of an fixed-sequence window method of determining a product of a scalar and a point on an elliptic curve.

Steps in a fixed-sequence window method of performing the scalar multiplication operation involved in determining the interim point S are presented in FIG. 3. The inputs to the fixed-sequence window method include: an odd scalar, k; a point, P; and a window size, w.

Notably, the fixed-sequence window method is presented as being concerned with finding the product, Q, of an odd scalar, k, and a base point, P. It should be clear to the person of ordinary skill in the art that, for the present purpose of determining the interim point S, the scalar is not k, but is the random number, r and the product is not Q but is the interim point S.

Initially, a processor executing the method constructs a table, $T_P$, (step 302) as having $2^w$ elements, where each element is an odd multiple of P. Details of the definition of the table and the values of the elements of the table are presented hereinafter in conjunction with a discussion of FIG. 4. The processor also shifts the scalar r right (step 304). In conjunction with the shifting, the processor translates (recodes) the shifted scalar to the base $2^w$.

$$r' = SHR(r) = (R'_{d-1} \ldots R'_0)_{2^w}. \quad (0.7)$$

The translated, shifted scalar, r', has d digits, where d is the smallest integer larger than a quotient obtained by dividing a dividend that is the number of bits, n, in the scalar by a divisor that is the window size, w. The processor then uses the most significant digit, i.e., digit (d−1), of the shifted and translated scalar to determine an initial value (step 306) for the product, $$S \leftarrow T_P[R'_{d-1} + 2^{w-1}]. \quad (0.8)$$

Upon determining an initial value for the product, the processor initializes (step 308) an iteration index i to the value (d−2). Recall that d is the number of digits in the translated, shifted scalar.

The processor next performs a pair of steps once for each of the remaining digits of the shifted and translated scalar. In the first step of the pair of steps, the processor doubles the product a number of times equivalent to the window size and assigns (step 310) the doubled product to the product, S, $$S \leftarrow 2^w S. \tag{0.9}$$

In the second step of the pair of steps, the processor adds (step 312) the product to the value stored in the element of the table $T_P$ indexed by a digit of the shifted and translated scalar, $$S \leftarrow S + T_P[R'_i]. \tag{0.10}$$

After determining (step 314) that the iteration index has not yet been reduced to zero, the processor decrements (step 316) the iteration index and performs the pair of steps (step 310 and step 312) again. After determining (step 314) that the iteration index has been reduced to zero, the processor returns (step 318) the product, S, to the example method of FIG. 1.

Figure 4:
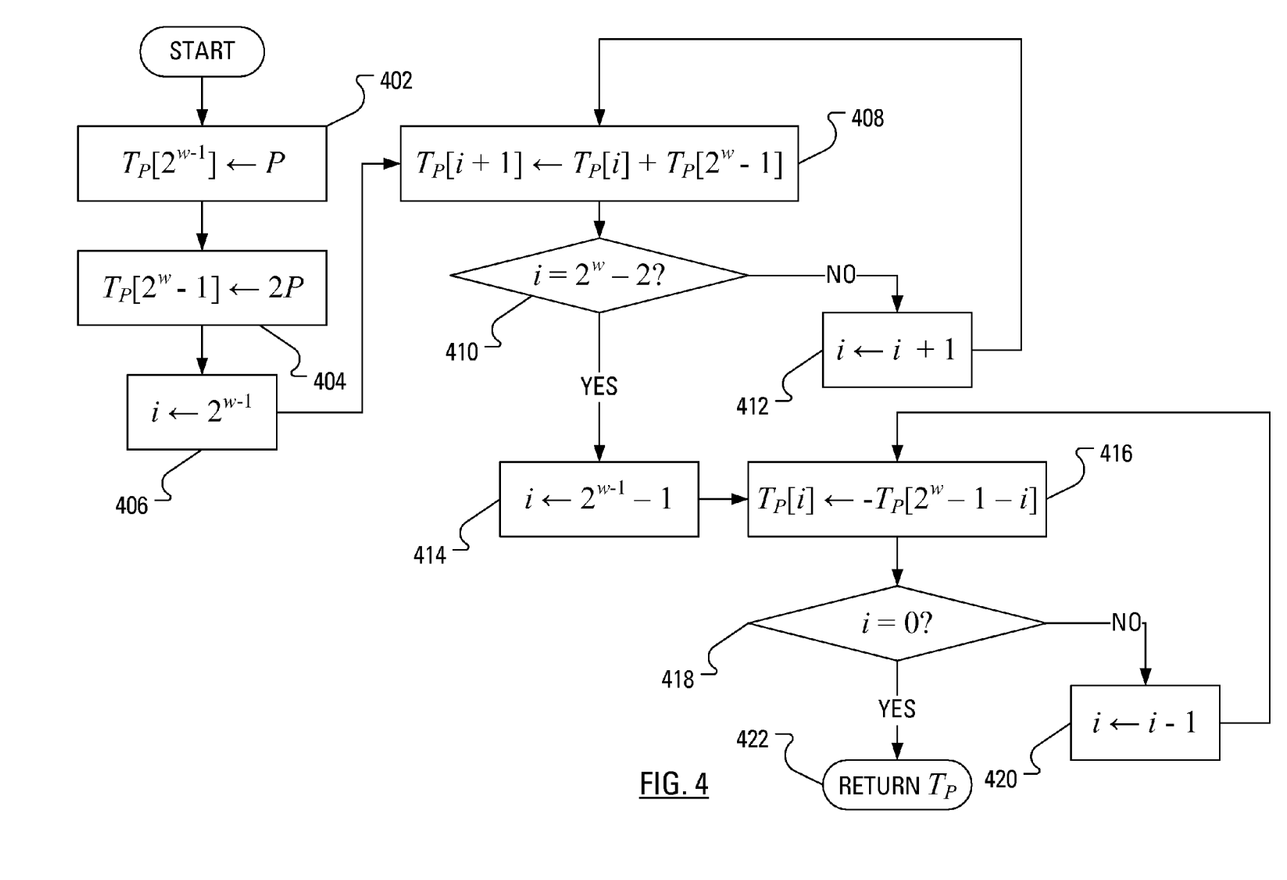
FIG. 4 illustrates steps of an example method of defining a table as required by the method of FIG. 2.

The steps presented in FIG. 4 define and populate the Table $T_P$. Initially, the processor assigns (step 402) the point P to the element of the Table $T_P$ with the index $2^{w-1}$, $$T_P[2^{w-1}] \leftarrow P. \tag{0.11}$$

The processor then assigns (step 404) twice the point P to the element of the table $T_P$ with the index $(2^w-1)$, $$T_P[2^w-1] \leftarrow 2P. \tag{0.12}$$

Once these two elements of the table $T_P$ have been initialized, the values stored in the initialized elements may be used to generate values for storing in the remaining elements. To this end, the processor initializes (step 406) an iteration index, i, to $2^{w-1}$ and populates (step 408) one of the elements of the table $T_P$ having an index greater than $2^{w-1}$, $$T_P[i+1] \leftarrow T_P[i] + T_P[2^w-1]. \tag{0.13}$$

After determining (step 410) that the iteration index has not surpassed $2^w-2$, the processor increments (step 412) the iteration index and populates (step 408) another one of the elements of the table $T_P$ having indices greater than $2^{w-1}$.

Upon determining (step 410) that the iteration index has reached $2^w-2$, the processor re-initializes (step 414) the iteration index, i, to $(2^{w-1}-1)$ and populates (step 416) one of the elements of the table $T_P$ having an index less than or equal to $(2^{w-1}-1)$, $$T_P[i] \leftarrow -T_P[2^w-1-i]. \tag{0.14}$$

After determining (step 418) that the iteration index has not yet been reduced to zero, the processor decrements (step 420) the iteration index and populates (step 416) another one of the elements of the table $T_P$ having an index less than or equal to $(2^{w-1}-1)$. After determining (step 418) that the iteration index has been reduced to zero, it may be considered that the table definition step (step 402, FIG. 4) is complete. In particular, each element of the table $T_P$ stores the base point P multiplied by an odd integer ranging from $-(2^w-1)$ to $(2^w-1)$ and the processor returns (step 422) the table, $T_P$, to the example method of FIG. 4. Advantageously, the definition and population of the table $T_P$ is independent of the scalar.

The method of FIG. 3 includes an assumption that r is an odd integer. To handle situations wherein r is not odd, it is proposed to keep the value of the least significant bit, $r_0$, that is shifted out in the shift right implemented in step 304. Upon completion of the loop including steps 310 and 312 in FIG. 3, that is, once i=0, if the processor determines that $r_0=0$, then the processor subtracts P from S, that is, the processor can be arranged to perform a point addition described by $S+T_P[2^{w-1}-1]$. Recall that the value stored in $T_P[2^{w-1}-1]$ is −P. Otherwise, that is, if $r_0=1$, the processor can be arranged to perform a dummy point addition.

Once the interim point S=rP has been determined (step 106), the determination of kP continues with the evaluation of equation (0.5) (step 108).

Equation (0.5) may be evaluated using an "Interleaving" method. The Interleaving method is a multiple point multiplication method. That is, we want to determine $\Sigma k^j P_j$ for input points $P_j$ and integers $k_j$. In the known comb and simultaneous multiplication methods, values are pre-computed and each of the precomputed values is a sum of the multiples of the input points. In contrast, in the Interleaving method, each precomputed value is simply a multiple of one of the input points. Hence, the required storage and the number of point additions at the pre-computation phase is decreased at the expense of the number of point additions in a main loop.

The Interleaving method is flexible in that each $k_j$ can have a different representation, e.g., different window size, as if a separate execution of a windows method is performed for each $k^j P_j$ with a doubling step performed jointly on a common accumulator point, as shown in B. Möller, "Algorithms for Multi-exponentiation", In SAC 2001, LNCS 2259, pp. 165-180, 2001 and in D. Hankerson, A. Menezes, S. Vanstone, *Guide to Elliptic Curve Cryptography*, Springer-Verlag, 2004. As an illustration, a representation of the Interleaving method follows, with a goal of determining gS+hP where both g and h are represented to the same base $2^w$.

Figure 5:
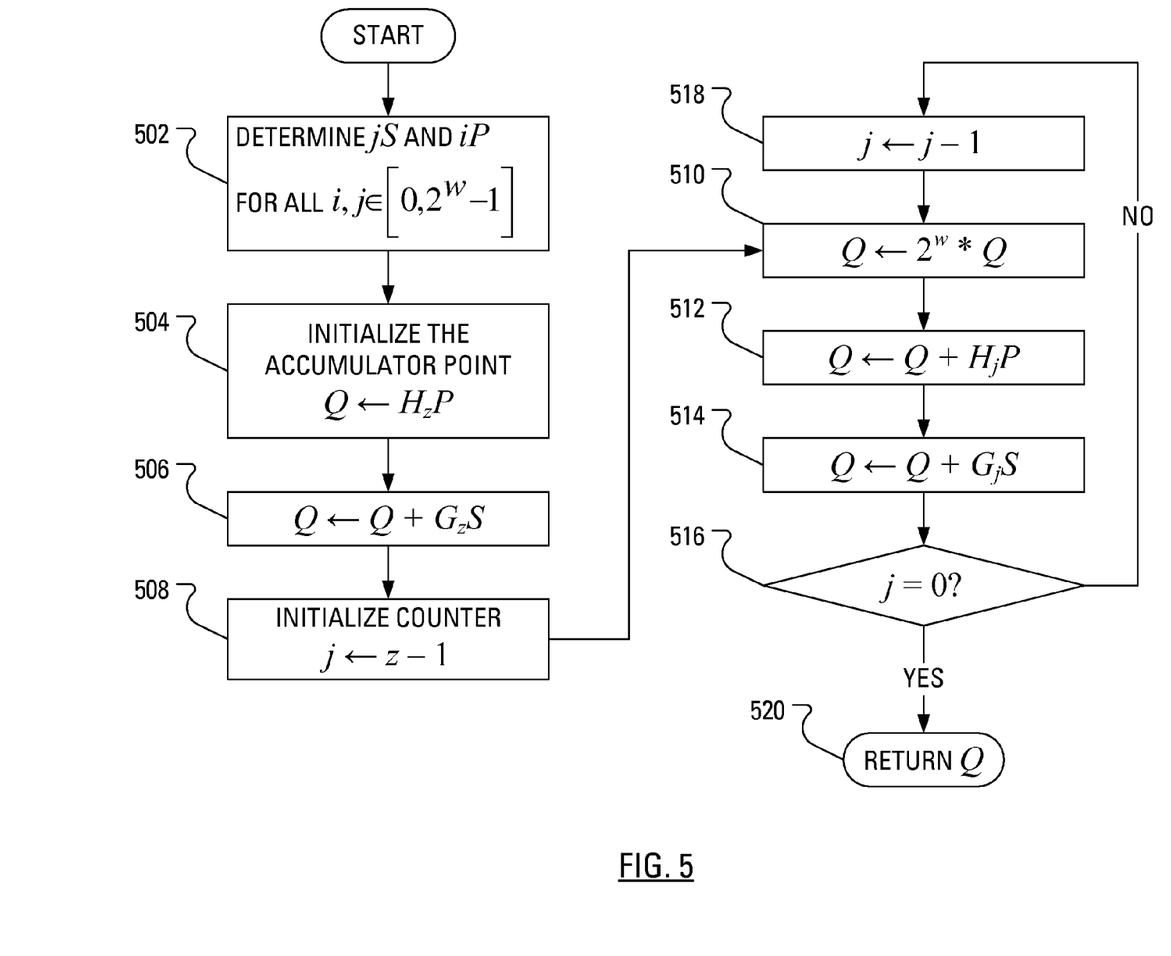
FIG. 5 illustrates steps of an Interleaving method of determine a sum of a series of products.

The Interleaving method, example steps of which are illustrated in FIG. 5, begins given input including a window width, w, $$z = \left\lceil \frac{l}{w} \right\rceil,$$

$g=(G_z, \ldots, G_1, G_0)_{2^w}$, $h=(H_z, \ldots, H_1, H_0)_{2^w}$ and P, S∈E ($F_q$). Note that g and h are represented as having z+1 digits, even though $G_z \leq 1$ and $H_z=0$. From these input values, the Interleaving method produces an output equivalent to gS+hP.

In a pre-computation stage, ahead of the execution of the method, a processor determines (step 502) jS and iP for all i, j∈[0,$2^w$−1]. The Interleaving method first involves initializing (step 504) an accumulator point (Q←$H_z$P). The processor then replaces (step 506) the accumulator point with a sum of the accumulator point and a $z^{th}$ indexed first product (Q←Q+$G_z$S). The Interleaving method then requires the processor to execute a main loop for j from z−1 down to 0. Accordingly, the processor initializes (step 508) a counter, j, to z−1. During the main loop, the processor doubles (step 510) the accumulator point w times (Q←$2^w$Q), the processor replaces (step 512) the accumulator point with a sum of the accumulator point and a $j^{th}$ indexed second product (Q←Q+$H_j$P) and then replaces (step 514) the accumulator point with a sum of the accumulator point and a $j^{th}$ indexed first product (Q←Q+$G_j$S). The processor then determines (step 516) whether the counter has reached zero. If the counter has not reached zero, the processor decrements the counter (step 518) and repeats steps 510, 512 and 514. If the counter has reached zero, the processor returns the accumulator point to the calling method.

The fixed-sequence window method of performing a scalar multiplication operation presented in FIG. 3 may be combined with the Interleaving method presented in FIG. 5 for determining a sum of a series of products as presented in equation (0.5). The inputs to the combined Interleaving and fixed-sequence window method include: two scalars, g and h; an intermediate point, S; a table, $T_P$, of odd multiples of a base point P; and a window size, w.

Figure 6:
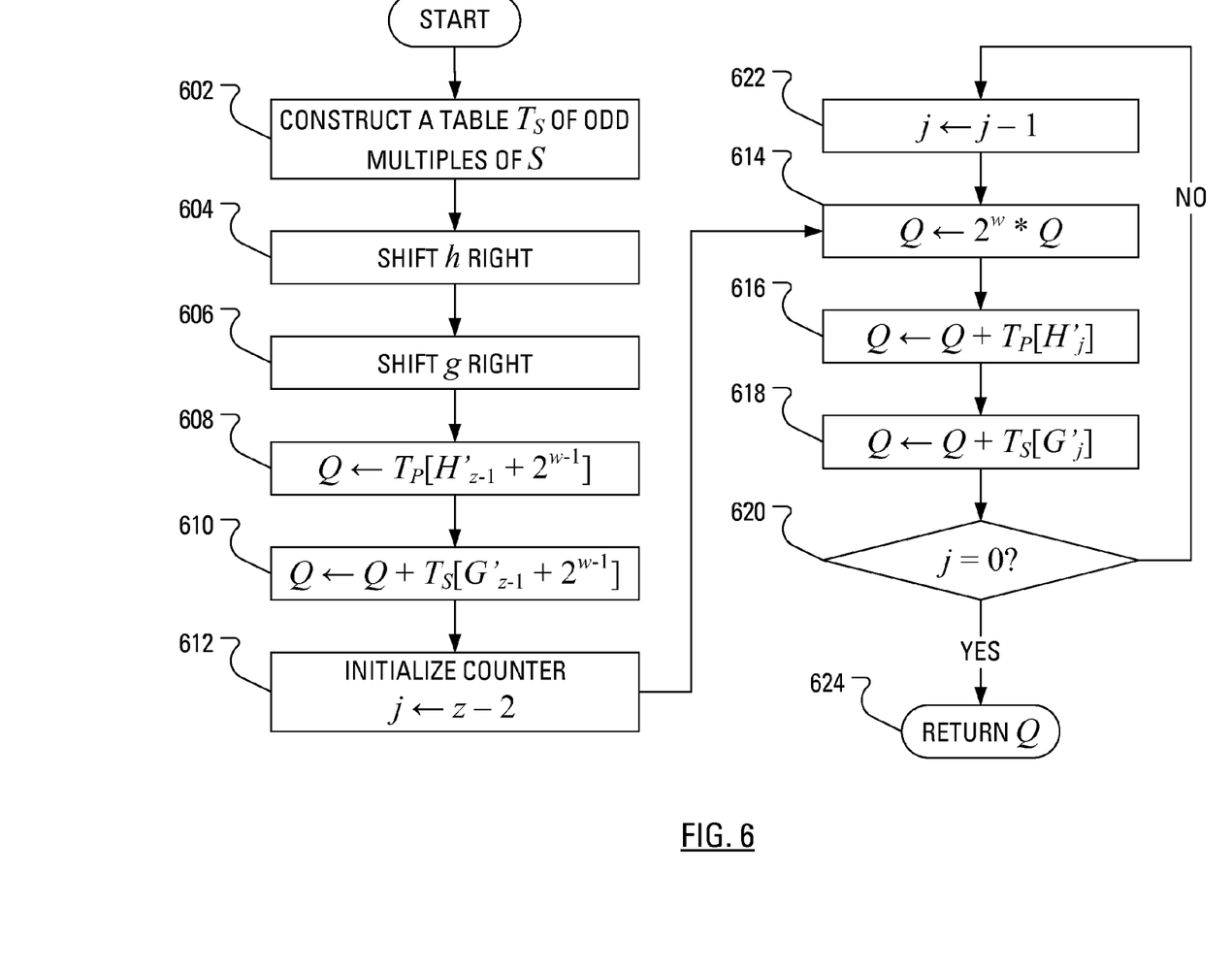
FIG. 6 illustrates steps of an example method of performing an Elliptic Curve Scalar Multiplication (ECSM) operation as required by the method of FIG. 1, where said example method combines the fixed-sequence window method of FIG. 3 and the Interleaving method of FIG. 5.

Initially, a processor executing the hybrid fixed-sequence window and Interleaving method, whose example steps are illustrated in FIG. 6, constructs a Table, $T_S$, (step 602) as having $2^w$ elements, where each element is an odd multiple of the intermediate point S. A Table, $T_P$, of odd multiples of P is also required, but it is assumed that $T_P$ has been already determined in step 302 of FIG. 3. The construction of the table $T_S$ (step 602) may be implemented in manner consistent with the construction of the table $T_P$ previously presented in conjunction with a discussion of FIG. 4.

The processor next shifts the first of the two scalars, h, right (step 604) and translates (recodes) (step 604) the shifted first scalar to the base $2^w$, $$h' = SHR(h) = (H'_{d-1} \ldots H'_0)_{2^w}. \quad (0.15)$$

The processor also shifts the second of the two scalars, g, right (step 606) and translates (recodes) (step 606) the shifted second scalar to the base $2^w$, $$g' = SHR(g) = (G'_{d-1} \ldots G'_0)_{2^w}. \quad (0.16)$$

The translated, shifted scalars, g', h', have z digits, where z is the smallest integer larger than a quotient obtained by dividing a dividend that is the number of bits, l, in the shifted scalars by a divisor that is the window size, w. The processor then uses the most significant digit, i.e., digit (z−1), of the shifted and translated first scalar to determine an initial value (step 608) for the accumulator point, $$Q \leftarrow T_P[H'_{z-1} + 2^{w-1}]. \quad (0.17)$$

The processor then amends (step 610) the initial value of the accumulator point while using the most significant digit of the shifted and translated second scalar, $$Q \leftarrow Q + T_S[G'_{z-1} + 2^{w-1}]. \quad (0.18)$$

Upon determining an amended initial value for the accumulator point, the processor initializes (step 612) an iteration index j to the value (z−2). Recall that z is the number of digits in the translated, shifted scalars.

The processor next performs a trio of steps once for each of the remaining digits of the shifted and translated scalars. In the first step of the trio of steps, the processor doubles the product a number of times equivalent to the window size and assigns (step 614) the doubled product to the accumulator point, Q, $$Q \leftarrow 2^w Q. \quad (0.19)$$

In the second step of the trio of steps, the processor replaces (step 616) the accumulator point with a sum of the accumulator point and the value stored in the element of the table $T_P$ indexed by a j-indexed digit of the shifted and translated first scalar, $$Q \leftarrow Q + T_P[H'_j]. \quad (0.20)$$

In the third step of the trio of steps, the processor replaces (step 618) the accumulator point with a sum of the accumulator point and the value stored in the element of the table $T_S$ indexed by a j-indexed digit of the shifted and translated second scalar, $$Q \leftarrow Q + T_S[G'_j]. \quad (0.21)$$

After determining (step 620) that the iteration index has not yet been reduced to zero, the processor decrements (step 622) the iteration index and performs the trio of steps (step 614, step 616 and step 618) again. After determining (step 620) that the iteration index has been reduced to zero, the processor returns (step 624) the accumulator point, Q, to the example method of FIG. 1.

As mentioned earlier, the fixed-sequence window method of FIG. 3 includes an assumption that the scalar is an odd integer. Similarly, the hybrid fixed-sequence window and Interleaving method of FIG. 6 includes an assumption that the scalars g and h are odd integers.

To handle situations wherein g is not odd, it is proposed to keep the value of the least significant bit, $g_0$, that is shifted out in the shift right implemented in step 606. Upon completion of the loop including steps 614, 616 and 618 in FIG. 6, that is, once j=0, if the processor determines that $g_0=0$, then the processor subtracts S from Q, that is, the processor can be arranged to perform a point addition described by $Q+T_S[2^{w-1}-1]$. Recall that the value stored in $T_S[2^{w-1}-1]$ is −S. Otherwise, that is, if $g_0=1$, the processor can be arranged to perform a dummy point addition.

To handle situations wherein h is not odd, it is proposed to keep the value of the least significant bit, $h_0$, that is shifted out in the shift right implemented in step 606. Upon completion of the loop including steps 614, 616 and 618 in FIG. 6, that is, once j=0, if the processor determines that $h_0=0$, then the processor subtracts P from Q, that is, the processor can be arranged to perform a point addition described by $Q+T_P[2^{w-1}-1]$. Recall that the value stored in $T_P[2^{w-1}-1]$ is −P. Otherwise, that is, if $h_0=1$, the processor can be arranged to perform a dummy point addition.

Let the representation of k the base $2^w$, for some $w \geq 1$, be $(K_{2z-1}, \ldots, K_1, K_0)_{2^w}$, where $$z = \left\lceil \frac{l}{w} \right\rceil,$$

that is $1 \leq zw \leq l+w-1$. If $l < zw$, then $G_z = 0$, otherwise, if $l = zw$, then $G_z \leq 1$. Let $K_{b \rightarrow a}$ denote $$\left\lfloor \frac{k \bmod 2^{bw+1}}{2^{aw}} \right\rfloor$$

or, simply, the w-bit digits of k from digit position b down to digit position a, with $b \geq a$. To simplify the expression of the following, a term $k^j$ may be introduced, defined as $k^j = G_{z \rightarrow j} * r + H_{z \rightarrow j}$.

A "major collision" may be defined as the occurrence of $k^j = K_{2z-1 \rightarrow j}$ at some iteration $j \in [1, z-1]$. That is, there may be a situation during the execution of the loop represented as steps 614, 616, 618, 620 and 622 wherein the first digits of the effective scalar $k^j$ match the first digits of the actual scalar k, which situation is undesirable. Additionally, another situation is called a "minor collision" and is defined as occurring when $k_1^j = k_2^j \neq K_{2z-1 \rightarrow j}$, at some iteration $j \in [1, z]$, for two values of r: $r_1$ and $r_2$, chosen such that $r_1 \neq r_2$.

To assess the likelihood of a major collision, at some iteration j in the loop in the hybrid fixed-sequence window and Interleaving method of FIG. 6, the product may be represented as $Q = \kappa^j P$, where $\kappa^j = \gamma_{z-1 \rightarrow j} * r + \eta_{z-1 \rightarrow j}$, $\gamma_j = R(G'_j)$ and $\eta_j = R(H'_j)$. Where the function R is representative of the factor that multiplies the point in a table (i.e., $T_S$ or $T_P$) of multiples of a point. For instance, $T_S[G'_j] = R(G'_j)S$.

Lemma 3. For some $j \in [1, z-1]$, $\kappa^j = \tilde{K}_{2z-1 \rightarrow j} + b$, where $b \in \{0, 1\}$, iff $g_{jw \rightarrow 0} = 2^{jw}$. Moreover, $b = 1 - h_{jw}$.

From our understanding of the underlying idea of the fixed-sequence window method by Thériault, we have $$k = \kappa^{j} * 2^{jw} + (\gamma_{j-1 \to 0} - (1-g_0)) * r + (\eta_{j-1 \to 0} - (1-h_0)) \quad (0.22)$$

and $$k = K_{2z-1 \to j} * 2^{jw} + K_{j-1 \to 0} \quad (0.23)$$

Also from Thériault, we know that $\eta_{j-1} = H_{j-1} - (1-h_{jw})2^w + (1-h_{(j-1)w})$. Hence equation (0.22) becomes $$k = (\kappa^{j} - (1-h_{jw})) * 2^{jw} + (\gamma_{j-1 \to 0} - (1-g_0)) * r + (H_{j-1} + (1-h_{(j-1)w})) * 2^{(j-1)w} + (\eta_{j-2 \to 0} - (1-h_0)) \quad (0.24)$$

where $g_0$ and $h_0$ are the least significant bits of g and h, respectively.

It can be proven that $\kappa^{j} - (1-h_{jw}) = K_{2z-1 \to j}$ iff $(\gamma_{j-1 \to 0} - (1-g_0)) = 0$. If $g_0 = 1$ there is no collision since, due to the definition of $\gamma_j$, $\gamma_{j-1 \to 0} \neq 0$. Accordingly, major collisions may be avoided by making the quotient g odd.

The condition for a major collision in the hybrid fixed-sequence window and Interleaving method represented by the example steps of FIG. 6 when $g_0 = 0$ (i.e., when the quotient g is even) may be represented as $$\gamma_{j-1 \to 0} = 1. \quad (0.25)$$

It can easily be verified that the condition of equation (0.25) holds when $$\gamma_i = \begin{cases} 1 & i = j-1 \\ -15 & 0 \leq i < j-1. \end{cases} \quad (0.26)$$

This is particularly true since $\gamma_i$ cannot be 0. By doing the inverse mapping $R^{-1}(\gamma_i)$, we obtain $$G'_i = \begin{cases} 2^{w-1} & i = j-1 \\ 0 & 0 \leq i < j-1. \end{cases} \quad (0.27)$$

from which it may be deduced that $g_{jw \to 0} = (10 \ldots 0) = 2^{jw}$.

Since, when the quotient g is even, the condition for a major collision depends on the value of the least significant $jw+1$ bits of the quotient g, the probability of the occurrence of this collision is around $2^{-(jw+1)}$ for both values of $h_{jw}$, which are expected to be equally likely.

These conditions can be avoided for all j by excluding the g values having w least significant 0s. Though this method of avoiding collisions will exclude values that cause no collisions, it is easier than checking for every $j \in [1, z-2]$ whether equation (0.27) is satisfied.

Additionally, minor collisions may be minimized by randomizing the coordinates of the accumulator after the initialization (i.e., after step 610) where the point is represented in projective coordinates.

Figure 7:
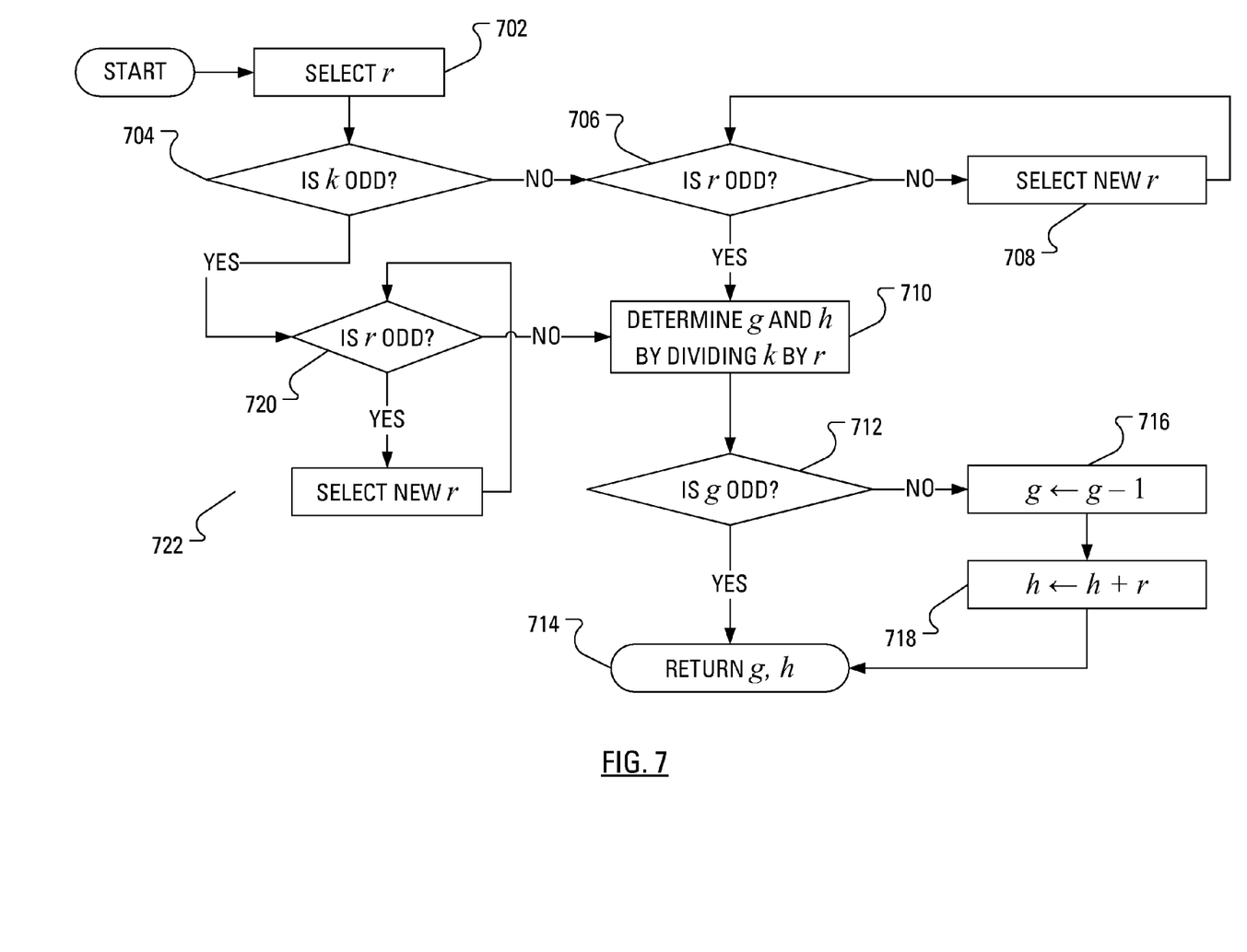
FIG. 7 illustrates steps of an example method of obtaining odd key splitting parameters as required by the example method of FIG. 1, according to an embodiment.

An example method of forcing the quotient g to be odd, thereby avoiding major collisions, while obtaining the key splitting parameters g and h (step 104, FIG. 1) is presented in FIG. 7. The method begins with a selection (step 702), by a processor carrying out the method, of a random integer, r. The processor then determines (step 704) whether the scalar private key k is odd or even. If the scalar private key is even, a random number that is chosen to be odd is preferred. Accordingly, the processor then determines (step 706) whether the random number r is odd or even. If the random number r is determined to be even, the processor selects (step 708) a new random number. The processor then determines (step 706) whether the new random number r is odd or even. Steps 708 and 706 continue until the selected random number is odd. Upon selecting an odd random number, the processor determines an integer quotient, g, and remainder, h, by dividing (step 710) the scalar private key k by the random number, r. The processor then determines (step 712) whether the integer quotient g is odd or even. If the integer quotient g is odd, it can be shown that the remainder h will also be odd. The processor returns (step 714) the key-splitting parameters to the example method of FIG. 1. If the integer quotient is determined (step 712) to be even, the integer quotient can be made odd while ensuring that the remainder h is also odd. The processor decrements (step 716) the integer quotient by one and adds (step 718) the random number to the remainder. This will make both the integer quotient and the remainder odd. The processor returns (step 714) the key-splitting parameters to the example method of FIG. 1.

If the scalar private key is odd, a random number that is chosen to be even is preferred. Accordingly, the processor then determines (step 720) whether the random number r is odd or even. If the random number r is determined to be odd, the processor selects (step 722) a new random number. The processor then determines (step 720) whether the new random number r is odd or even. Steps 720 and 722 continue until the random number is found to be even. Upon selecting an even random number, the processor determines an integer quotient, g, by dividing (step 710) the scalar private key k by the random number, r. The processor then determines (step 712) whether the integer quotient g is odd or even. If the integer quotient g is odd, it can be shown that the remainder h will also be odd. The processor returns (step 714) the key-splitting parameters to the example method of FIG. 1. Due to the scalar private key being odd and the random number being even, it can be shown that the remainder h will always be odd. Responsive to determining (step 710) that the integer quotient is even, the processor decrements (step 716) the integer quotient by one and adds (step 718) the random number to the remainder. This will make the integer quotient odd and the integer remainder will remain odd. The processor returns (step 714) the key-splitting parameters to the example method of FIG. 1.

Figure 8:
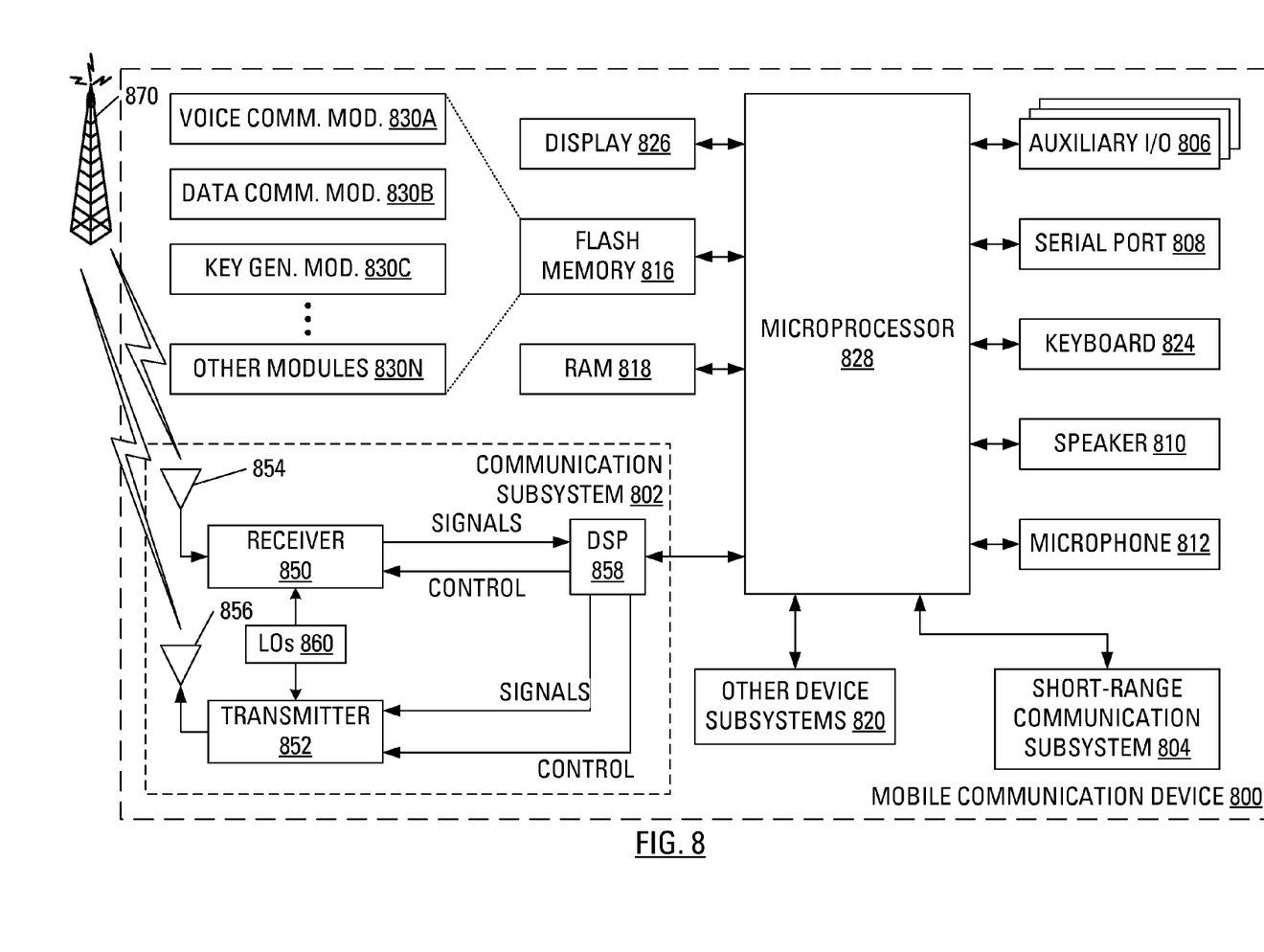
FIG. 8 illustrates an apparatus for carrying out the method of FIG. 1.

FIG. 8 illustrates a mobile communication device 800 as an example of a device that may carry out the method of FIG. 1. The mobile communication device 800 includes a housing, an input device (e.g., a keyboard 824 having a plurality of keys) and an output device (e.g., a display 826), which may be a full graphic, or full color, Liquid Crystal Display (LCD). In some embodiments, the display 826 may comprise a touchscreen display. In such embodiments, the keyboard 824 may comprise a virtual keyboard. Other types of output devices may alternatively be utilized. A processing device (a microprocessor 828) is shown schematically in FIG. 8 as coupled between the keyboard 824 and the display 826. The microprocessor 828 controls the operation of the display 826, as well as the overall operation of the mobile communication device 800, in part, responsive to actuation of the keys on the keyboard 824 by a user.

The housing may be elongated vertically, or may take on other sizes and shapes (including clamshell housing structures). Where the keyboard 824 includes keys that are associated with at least one alphabetic character and at least one numeric character, the keyboard 824 may include a mode selection key, or other hardware or software, for switching between alphabetic entry and numeric entry.

In addition to the microprocessor 828, other parts of the mobile communication device 800 are shown schematically in FIG. 8. These may include a communications subsystem 802, a short-range communications subsystem 804, the keyboard 824 and the display 826. The mobile communication device 800 may further include other input/output devices including a set of auxiliary I/O devices 806, a serial port 808, a speaker 810 and a microphone 812. The mobile communication device 800 may further include memory devices including a flash memory 816 and a Random Access Memory (RAM) 818 and various other device subsystems 820. The mobile communication device 800 may be a two-way radio frequency (RF) communication device having voice and data communication capabilities. In addition, the mobile communication device 800 may have the capability to communicate with other computer systems via the Internet.

Operating system software executed by the microprocessor 828 may be stored in a computer readable medium, such as the flash memory 816, but may be stored in other types of memory devices, such as a read only memory (ROM) or similar storage element. In addition, system software, specific device applications, or parts thereof, may be temporarily loaded into a volatile store, such as the RAM 818. Communication signals received by the mobile device may also be stored to the RAM 818.

The microprocessor 828, in addition to its operating system functions, enables execution of software applications on the mobile communication device 800. A predetermined set of software applications that control basic device operations, such as a voice communications module 830A and a data communications module 830B, may be installed on the mobile communication device 800 during manufacture. A public key generation module 830C may also be installed on the mobile communication device 800 during manufacture, to implement aspects of the present disclosure. As well, additional software modules, illustrated as an other software module 830N, which may be, for instance, a PIM application, may be installed during manufacture. The PIM application may be capable of organizing and managing data items, such as e-mail messages, calendar events, voice mail messages, appointments and task items. The PIM application may also be capable of sending and receiving data items via a wireless carrier network 870 represented by a radio tower. The data items managed by the PIM application may be seamlessly integrated, synchronized and updated via the wireless carrier network 870 with the device user's corresponding data items stored or associated with a host computer system.

Communication functions, including data and voice communications, are performed through the communication subsystem 802 and, possibly, through the short-range communications subsystem 804. The communication subsystem 802 includes a receiver 850, a transmitter 852 and one or more antennas, illustrated as a receive antenna 854 and a transmit antenna 856. In addition, the communication subsystem 802 also includes a processing module, such as a digital signal processor (DSP) 858, and local oscillators (LOs) 860. The specific design and implementation of the communication subsystem 802 is dependent upon the communication network in which the mobile communication device 800 is intended to operate. For example, the communication subsystem 802 of the mobile communication device 800 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), etc.

Other types of data and voice networks, both separate and integrated, may also be utilized with the mobile communication device 800.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the mobile communication device 800 may send and receive communication signals over the wireless carrier network 870. Signals received from the wireless carrier network 870 by the receive antenna 854 are routed to the receiver 850, which provides for signal amplification, frequency down conversion, filtering, channel selection, etc., and may also provide analog to digital conversion. Analog-to-digital conversion of the received signal allows the DSP 858 to perform more complex communication functions, such as demodulation and decoding. In a similar manner, signals to be transmitted to the wireless carrier network 870 are processed (e.g., modulated and encoded) by the DSP 858 and are then provided to the transmitter 852 for digital to analog conversion, frequency up conversion, filtering, amplification and transmission to the wireless carrier network 870 (or networks) via the transmit antenna 856.

In addition to processing communication signals, the DSP 858 provides for control of the receiver 850 and the transmitter 852. For example, gains applied to communication signals in the receiver 850 and the transmitter 852 may be adaptively controlled through automatic gain control algorithms implemented in the DSP 858.

In a data communication mode, a received signal, such as a text message or web page download, is processed by the communication subsystem 802 and is input to the microprocessor 828. The received signal is then further processed by the microprocessor 828 for output to the display 826, or alternatively to some auxiliary I/O devices 806. A device user may also compose data items, such as e-mail messages, using the keyboard 824 and/or some other auxiliary I/O device 806, such as a touchpad, a rocker switch, a thumb-wheel, a trackball, a touchscreen, or some other type of input device. The composed data items may then be transmitted over the wireless carrier network 870 via the communication subsystem 802.

In a voice communication mode, overall operation of the device is substantially similar to the data communication mode, except that received signals are output to a speaker 810, and signals for transmission are generated by a microphone 812. Alternative voice or audio I/O subsystems, such as a voice message recording subsystem, may also be implemented on the mobile communication device 800. In addition, the display 826 may also be utilized in voice communication mode, for example, to display the identity of a calling party, the duration of a voice call, or other voice call related information.

The short-range communications subsystem 804 enables communication between the mobile communication device 800 and other proximate systems or devices, which need not necessarily be similar devices. For example, the short-range communications subsystem may include an infrared device and associated circuits and components, or a Bluetooth™ communication module to provide for communication with similarly-enabled systems and devices.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method, for being performed by a computer system, of publishing an Elliptic Curve scalar multiplication product of a scalar and a base point in a manner that counters side-channel attacks, said method comprising:
   selecting a random integer;
   determining a quotient key-splitting parameter and a remainder key-splitting parameter by performing an integer division operation with said scalar as dividend and said random integer as divisor;
   determining that at least one of said quotient key-splitting parameter and said remainder key-splitting parameter is even;
   selecting a further random integer;
   determining that both of said quotient key-splitting parameter and said remainder key-splitting parameter are odd;
   determining whether both said quotient key-splitting parameter and said remainder key-splitting parameter are odd, and if not repeating said selecting and said determining of said quotient key-splitting parameter and said remainder key-splitting parameter;
   determining an interim point as a product of said further random integer and said base point, wherein said determining said interim point includes performing a fixed-sequence windowing method that includes defining a first table, said first table including odd multiples of said base point;
   determining a sum of a first product and a second product, wherein factors of said first product include said quotient key-splitting parameter and said interim point and factors of said second product include said remainder key-splitting parameter and said base point, wherein said determining said sum includes performing an interleaving method combined with said fixed-sequence windowing method including defining a second table, said second table including odd multiples of said interim point; and
   publishing said sum as said product of said scalar and said base point.

2. The method of claim 1 wherein said fixed-sequence windowing method further includes, wherein said determining of said interim point further includes:
   shifting said further random integer right to create a shifted random integer;
   translating said shifted random integer to a base $2^w$, thereby forming a translated, shifted random integer, wherein w is a window size in said fixed-sequence windowing method; and
   determining, based on said translated, shifted random integer and said first table, a value for said interim point.

3. The method of claim 1 wherein said scalar is odd and said selecting said further random integer comprises selecting until said further random integer is even.

4. The method of claim 1 wherein said scalar is even and said selecting said further random integer comprises selecting until said further random integer is odd.

5. The method of claim 1 further comprising receiving a request for an Elliptic Curve Scalar Multiplication product of said scalar and said base point.

6. A mobile communication device comprising:
   a processor configured to, given a scalar and a base point:
      select a random integer;
      determine a quotient key-splitting parameter and a remainder key-splitting parameter by performing an integer division operation with said scalar as dividend and said random integer as divisor;
      determine that at least one of said quotient key-splitting parameter and said remainder key-splitting parameter is even;
      select a further random integer;
      determine that both of said quotient key-splitting parameter and said remainder key-splitting parameter are odd;
      determine an interim point as a product of said further random integer and said base point, wherein said determining said interim point includes performing a fixed-sequence windowing method that includes defining a first table, said first table including odd multiples of said base point;
      determine a sum of a first product and a second product, wherein factors of said first product include said quotient key-splitting parameter and said interim point and factors of said second product include said remainder key-splitting parameter and said base point, wherein said determining said sum includes performing an interleaving method combined with said fixed-sequence windowing method including defining a second table, said second table including odd multiples of said interim point; and
      publish said sum as said product of said scalar and said base point.

7. The mobile communication device of claim 6 wherein said processor is further configured to:
   shift said further random integer right to create a shifted random integer;
   translate said shifted random integer to a base $2^w$, thereby forming a translated, shifted random integer, wherein w is a window size in said fixed-sequence windowing method; and
   determine, based on said translated, shifted random integer and said first table, a value for said interim point.

8. The mobile communication device of claim 6 wherein said scalar is odd and wherein said processor is further configured to select said further random integer until said further random integer is even.

9. The mobile communication device of claim 6 wherein said scalar is even and wherein said processor is further configured to select said further random integer until said further random integer is odd.

10. The mobile communication device of claim 6 wherein said processor is further configured to receive a request for an Elliptic Curve Scalar Multiplication product of said scalar and said base point.

11. A non-transitory computer readable medium containing computer-executable instructions that, when executed on a processor given a scalar and a base point, cause said processor to:

select a random integer;
determine a quotient key-splitting parameter and a remainder key-splitting parameter by performing an integer division operation with said scalar as dividend and said random integer as divisor;
determine that at least one of said quotient key-splitting parameter and said remainder key-splitting parameter is even;
select a further random integer;
determine that both of said quotient key-splitting parameter and said remainder key-splitting parameter are odd;
determine an interim point as a product of said further random integer and said base point, wherein said determining said interim point includes performing a fixed-sequence windowing method that includes defining a first table, said first table including odd multiples of said base point;
determine a sum of a first product and a second product, wherein factors of said first product include said quotient key-splitting parameter and said interim point and factors of said second product include said remainder key-splitting parameter and said base point, wherein said determining said sum includes performing an interleaving method combined with said fixed-sequence windowing method including defining a second table, said second table including odd multiples of said interim point; and publish said sum as said product of said scalar and said base point.

12. The non-transitory computer readable medium of claim 11 wherein said instructions further cause said processor to:
shift said further random integer right to create a shifted random integer;
translate said shifted random integer to a base $2^w$, thereby forming a translated, shifted random integer, wherein w is a window size in said fixed-sequence windowing method; and
determine, based on said translated, shifted random integer and said first table, a value for said interim point.

13. The non-transitory computer readable medium of claim 11 wherein said scalar is odd and wherein said instructions further cause said processor to select said further random integer until said further random integer is even.

14. The non-transitory computer readable medium of claim 11 wherein said scalar is even and wherein said instructions further cause said processor to select said further random integer until said further random integer is odd.

15. The non-transitory computer readable medium of claim 11 wherein said instructions further cause said processor to receive a request for an Elliptic Curve Scalar Multiplication product of said scalar and said base point.

* * * * *